US006064877A

United States Patent [19]

Yanagida

[11] Patent Number: 6,064,877

[45] Date of Patent: May 16, 2000

[54] PORTABLE RADIO TERMINAL

[75] Inventor: Masayuki Yanagida, Tokyo, Japan

[73] Assignee: Matsushita Electrical Industrial Co., Ltd., Osaka, Japan

[21] Appl. No.: 09/093,510

[22] Filed: Jun. 8, 1998

[30] Foreign Application Priority Data

Jun. 18, 1997 [JP] Japan .................................... 9-176587

[51] Int. Cl.[7] .................................................. H04M 11/110

[52] U.S. Cl. ..................... 455/412; 455/31.1; 379/88.22; 379/88.28; 379/357

[58] Field of Search ................................ 455/31.1, 31.2, 455/31.3, 412, 413, 418, 420, 458, 459, 558, 557, 90, 566; 379/88.25, 88.22, 88.23, 88.28, 356, 67.1, 84, 357; 340/825.44; 711/126, 129, 133, 135–6, 147, 154–162

[56] References Cited

U.S. PATENT DOCUMENTS

| | | | |
|---|---|---|---|
| 5,049,874 | 9/1991 | Ishida et al. | 340/825.44 |
| 5,105,189 | 4/1992 | Murai et al. | 340/825.44 |
| 5,134,717 | 7/1992 | Sogaard Rasmussen | 455/564 |
| 5,177,477 | 1/1993 | Femell et al. | 340/825.44 |
| 5,177,780 | 1/1993 | Kasper et al. | 455/413 |
| 5,247,572 | 9/1993 | Koma | 379/356 |
| 5,687,216 | 11/1997 | Svensson | 455/412 |
| 5,898,930 | 4/1999 | Terashima et al. | 455/550 |
| 5,940,767 | 8/1999 | Bourgeois et al. | 455/466 |
| 5,946,630 | 8/1999 | Willars et al. | 455/466 |

*Primary Examiner*—Dwayne D. Bost
*Assistant Examiner*—Charles Craver
*Attorney, Agent, or Firm*—Pearne, Gordon, McCoy & Granger LLP

[57] ABSTRACT

If a user attempts to provide a protection attribute to a new message while the number of old messages which have a protection attribute and are retained is equal to the maximum number of protected messages, a portable radio terminal, such as a pager system, displays on an LCD 13 the oldest received message having a protection attribute. Only the messages having a protection attribute are displayed on the LCD 13 in chronological order of receipt by rotating a rotary switch 4. A message whose protection attribute is canceled is determined by pressing the rotary switch 4 while a message which the user desires to cancel is displayed. Simultaneously, the foregoing operation enables a new message which the user desires to protect to be provided with a protection attribute. An operation for canceling the protection attribute of an old received message and an operation for providing a protection attribute to a new message, both being required when the number of protected messages is equal to the maximum number of protected messages, are grouped into one operation, thus rendering simpler an operation for providing a protection attribute to a new message.

2 Claims, 3 Drawing Sheets

PORTABLE RADIO TERMINAL

BACKGROUND OF THE INVENTION

The present invention relates to a portable radio terminal such as a radio pager, and more particularly, to a radio portable terminal having a protection function of preventing deletion of a received message stored in the terminal.

A portable radio terminal, such as a radio pager, has a function of storing a received message. Since the number of messages which the radio terminal can store is finite, if the radio has received messages in excess of the storage capacity, the messages are automatically deleted in chronological order of receipt. Even if the user desires to have an important received message retained, the message will eventually be deleted, so long as the radio terminal continues to receive new messages. To prevent such a problem, the radio terminal is provided with a function of protecting received messages, thus enabling the user to designate important received messages desired for retention. If all messages which the radio terminal can store are protected, the radio terminal becomes unable to receive any new messages. For this reason, the number of protected messages is inevitably set to a number which is smaller than the maximum number of received messages to be stored. The maximum number of messages which can be protected will be hereinafter referred to as the "maximum protection number."

In an existing portable radio terminal, procedures for designating a received message a message to be protected will be described by reference to a block diagram shown in FIG. 1, which illustrates the configuration of-a pager system, as well as by reference to a flowchart regarding an existing message protection function shown in FIG. 3. First, the pager system changes to a message read mode by pressing a rotary switch 4 while the pager system is in a wait mode (SET step). An arbitrary message to be protected is selected (STEP 1) by rotating the rotary switch 4 (SLCT step). The pager system changes to a mode selection screen state by pressing a switch 5 while the thus-selected message is indicated on a display (MODE step), so that a protect/protect-cancel guidance message is displayed (STEP 2). In a case where the selected message has a protection attribute, a protect-cancel verification message is displayed together with the selected message by pressing the rotary switch 4 while the guidance is displayed (SET step). In contrast, if the selected message does not have a protection attribute, a protect verification message is displayed together with the selected message (STEP 3). When the rotary switch 4 is pressed while the message is displayed (SET step), a decision is made as to whether or not the message has a protection attribute (STEP 4).

In a case where the selected message does not have a protection attribute, if the current protect operation will cause the number of protected messages to exceed the maximum protection number as a result of a decision as to whether or not the maximum protection number is exceeded (STEP 5), a warning about exceeding the maximum protection number is displayed (STEP 6). Subsequently, the pager system changes to a state in which a protect verification message is displayed together with a selected message (STEP 3) as a result of a timeout occurring for one second (MODE step) or the rotary switch 4 (SET step) or the switch 5 (MODE step) being pressed. When the rotary switch 4 is rotated while the message is displayed (SLCT step), messages stored in the pager system are displayed in chronological order of receipt without regard of presence/absence of a protection attribute. From the thus-displayed messages, the user selects a message which has a protection attribute and is deemed to be least necessary. When the rotary switch 4 is pressed (SET step) while the selected message is displayed, a decision is made as to whether or not the message has a protection attribute (STEP 4). In this case, since the selected message has a protection attribute, the pager system cancels the protection of the message and decrements the current number of messages to be protected (STEP 10), thus displaying completion of the protect cancel operation (STEP 11). After the message regarding completion of the protect cancel operation has disappeared as a result of a timeout occurring for one second or the rotary switch 4 (SET step) or the switch 5 (MODE step) being pressed, an unprotected message is displayed (STEP 9). Simultaneously, the pager system returns to the message read mode.

A message originally desired to be protected is selected once again by rotating the rotary switch 4 (SLCT step) (STEP 1). When the switch 5 is pressed while the selected message is displayed (MODE step), the pager system changes to a mode selection screen, where the protect/protect-cancel guidance is displayed (STEP 2). When the rotary switch 4 is actuated (SET step) while the guidance is displayed, a protect verification message is displayed together with the thus-selected message (STEP 3). When the rotary switch 4 is pressed (SET step) while the message is displayed, a decision is made as to whether or not the message has a protection attribute (STEP 4).

Since the message does not have any protection attribute, a decision is made as to whether or not this protecting action will result in the number of protected messages exceeding the pager system's maximum-protection number (STEP 5). Since the message is unprotected and hence the maximum protection number is not exceeded, the number of protected messages is incremented (STEP 7), and a protection completed message is displayed (STEP 8). After the protection completed message has disappeared as a result of a timeout occurring for one second or the rotary switch 4 (SET step) or the switch 5 (MODE step) being pressed, the protected message is displayed with a protection-attribute mark (STEP 9). Simultaneously, the pager system returns to a message read mode (STEP 1).

If the user attempts to protect a new message while the number of protected messages is equal to the maximum protection number, the existing procedure mentioned previously requires the user to retrieve a message whose protection may be canceled from all the received messages, including received messages having no protection attribute, as well as to cancel the protection of the thus-selected message or to delete it. Further, the existing procedure requires the user to retrieve a message originally desired to be protected and to protect it. Thus, the existing procedures involves complicated key operations. Accordingly, the object of the present invention is to render simple an operation for protecting a message while the number of protected messages is equal to the maximum protection number.

SUMMARY OF THE INVENTION

To achieve the object, when the user attempts to protect a new message while the number of protected messages is equal to the maximum protection number, the present invention, by design, retrieves only protected messages whose protection are canceled; displays the messages in chronological order of receipt; encourages the user to select a message whose protection is canceled; and, when the user selects a message which can be made erasable, cancels the protection of the thus-selected message the instant when protecting a message desired to be protected.

With the foregoing arrangement, a portable radio terminal can be achieved which can protect a message with a simple key operation even when the number of protected messages is equal to the maximum protection number.

An invention according to aspect 1 of the present patent application is directed to a portable radio terminal including means for storing only a predetermined number of received messages, means for deleting the oldest message among messages having no protection attribute when the number of messages exceeds the predetermined number, means for changing the protection attribute of the message, and means for detecting a protection attribute having been provided to a message having no protection attribute while the number of messages having a protection attribute is equal to the maximum protection number, the terminal comprising:

means which, upon detection of execution of a protection-attribute assignment operation with regard to a message having no protection attribute while the number of messages having a protection attribute is equal to the maximum protection number, sequentially displays only messages having a protection attribute in response to actuation of a selection switch; and means which, upon detection of a determination switch being pressed while a message having a protection attribute is displayed as a message whose protection attribute is canceled, cancels the protection attribute of the message thus displayed. The present invention produces the effect of rendering simpler an operation for selecting a message whose protection attribute is canceled while the number of protected messages is maximum.

According to aspect 2 of the present patent application, the invention defined in aspect 1 is characterized by further comprising means which, upon detection of the determination switch being pressed while a message having a protection attribute is displayed as a message whose protection attribute is canceled, cancels the protection of the thus-displayed message the instant when providing a protection attribute to the message for which the protection attribute assignment operation has been performed. The present invention produces the effect of rendering simpler an operation for protecting a message while the number of protected messages is maximum.

Taking a pager system as an example, a portable radio terminal according to the present invention will be described by reference to FIGS. 1 and 2.

DETAILED DESCRIPTION OF THE PREFERRED EMBODIMENTS (Embodiment)

An embodiment of the present invention is directed to a portable radio terminal which, when a protection attribute is provided to a received message having no protection attribute while the number of protected messages is equal to the maximum protection number, displays only received messages having a protection attribute in chronological order of receipt. When the user selects one of the thus-displayed messages and determines the thus-selected message as that whose protection is canceled, the radio terminal cancels the protection of the selected message simultaneous with providing a protection attribute to a message originally desired to be protected.

Figure 1:
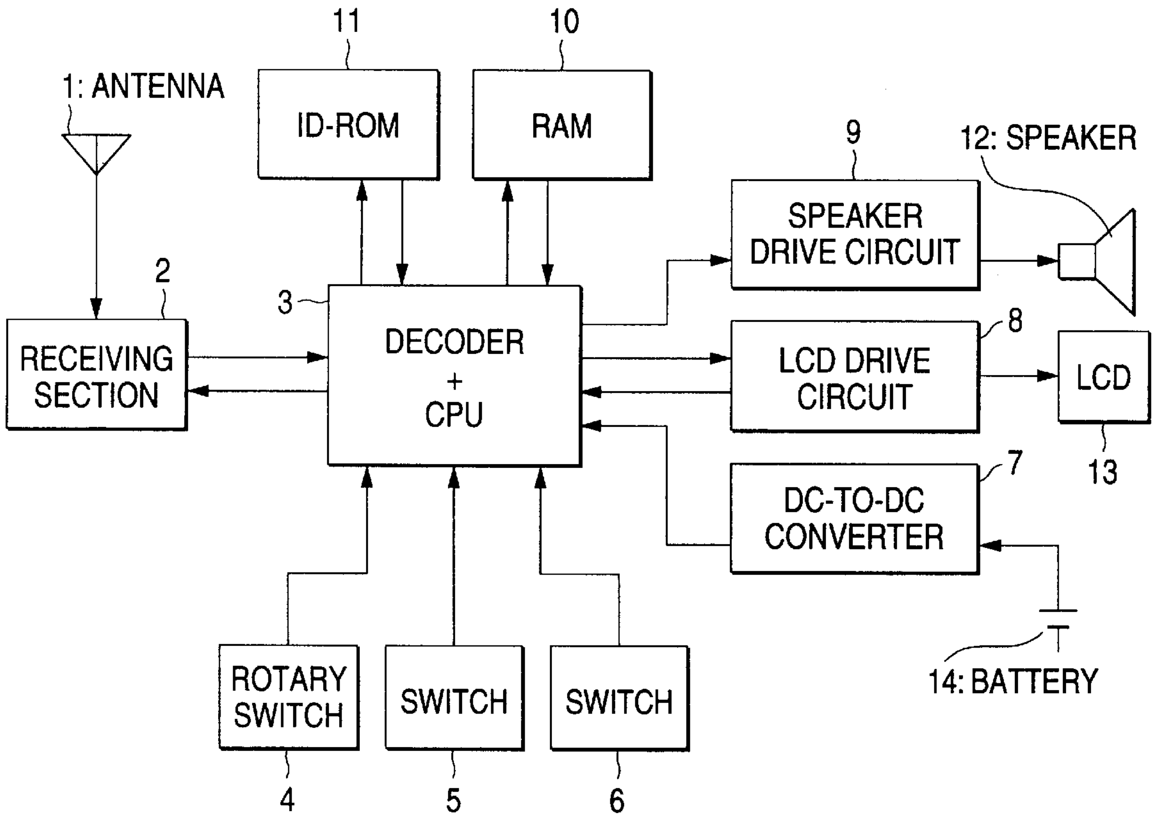
FIG. 1 is a block diagram showing a configuration of a pager system according to one embodiment of the present invention.

FIG. 1 shows the configuration of a pager system. As shown in FIG. 1, the pager system comprises an antenna 1 for receiving radio data; a receiving section 2; and an LSI chip 3 including a decoder for decoding received data and a CPU which performs software control operations including analysis of the received data. The pager system further comprises a rotary switch 4 for controlling the selection and determination of a message; a mode select switch 5; a power ON/Off switch 6; a DC to DC converter 7 for controlling a voltage; a power supply 14; an LCD drive circuit 8 for display purposes; an LCD 13; a speaker drive circuit 9 for audio purposes; a speaker 12; RAM 10 for storing messages; and ID-ROM 11 which stores information about an address of the pager itself or the like.

Figure 2:
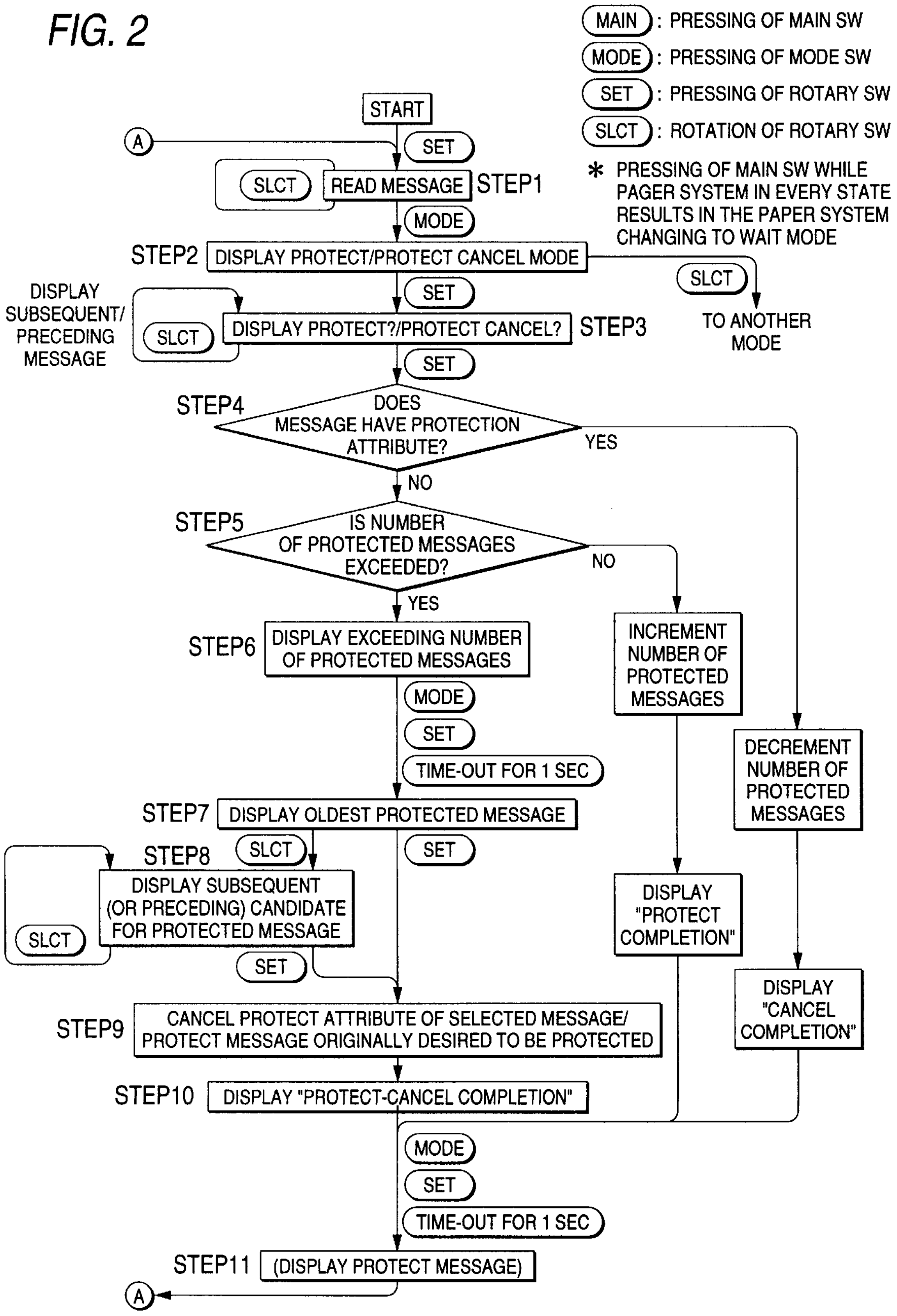
FIG. 2 is a flowchart showing a message protection function of the pager system according to the embodiment of the present invention.
Figure 3:
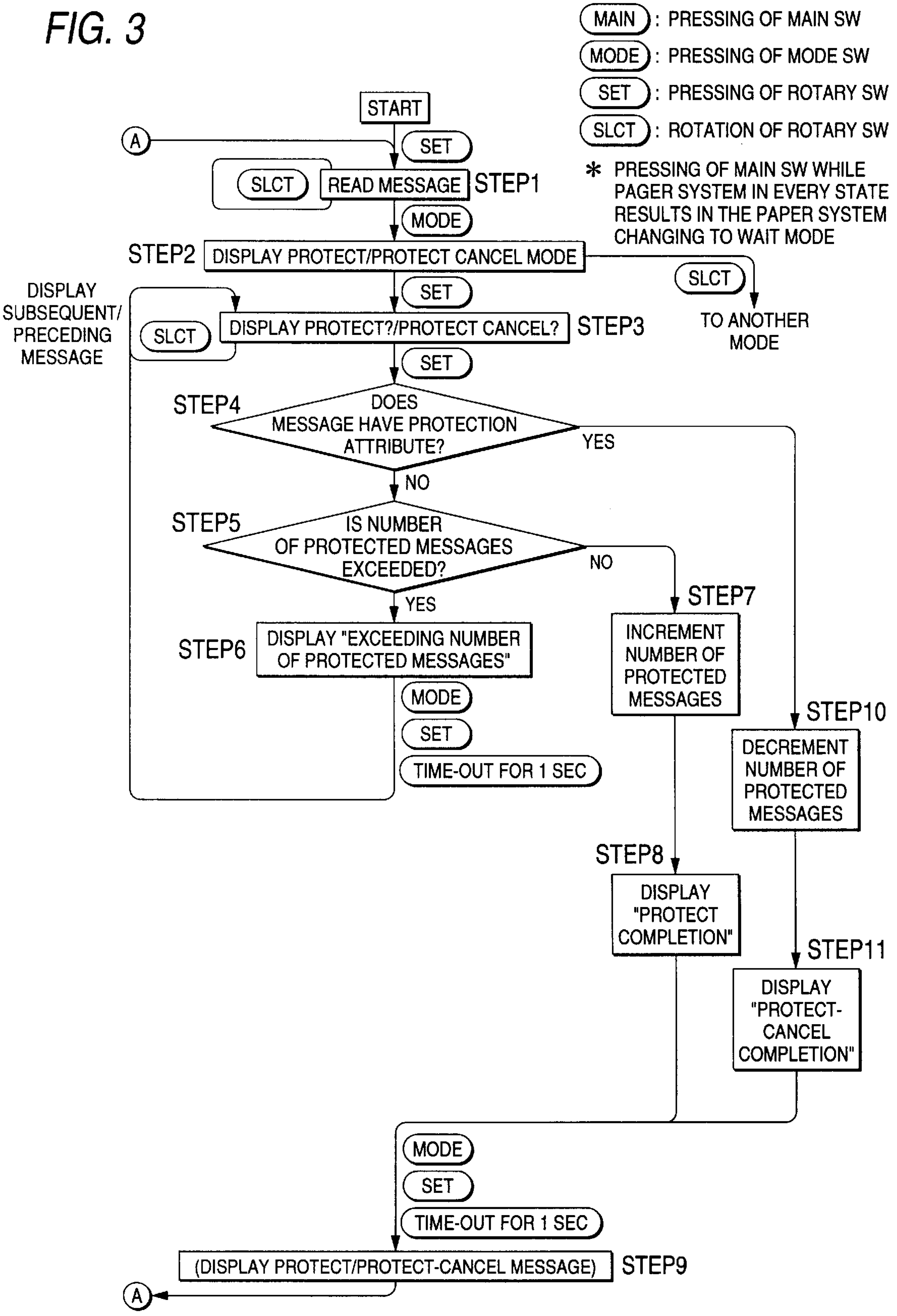
FIG. 3 is a flowchart showing a message protection function of an existing pager system.
Figure 1:
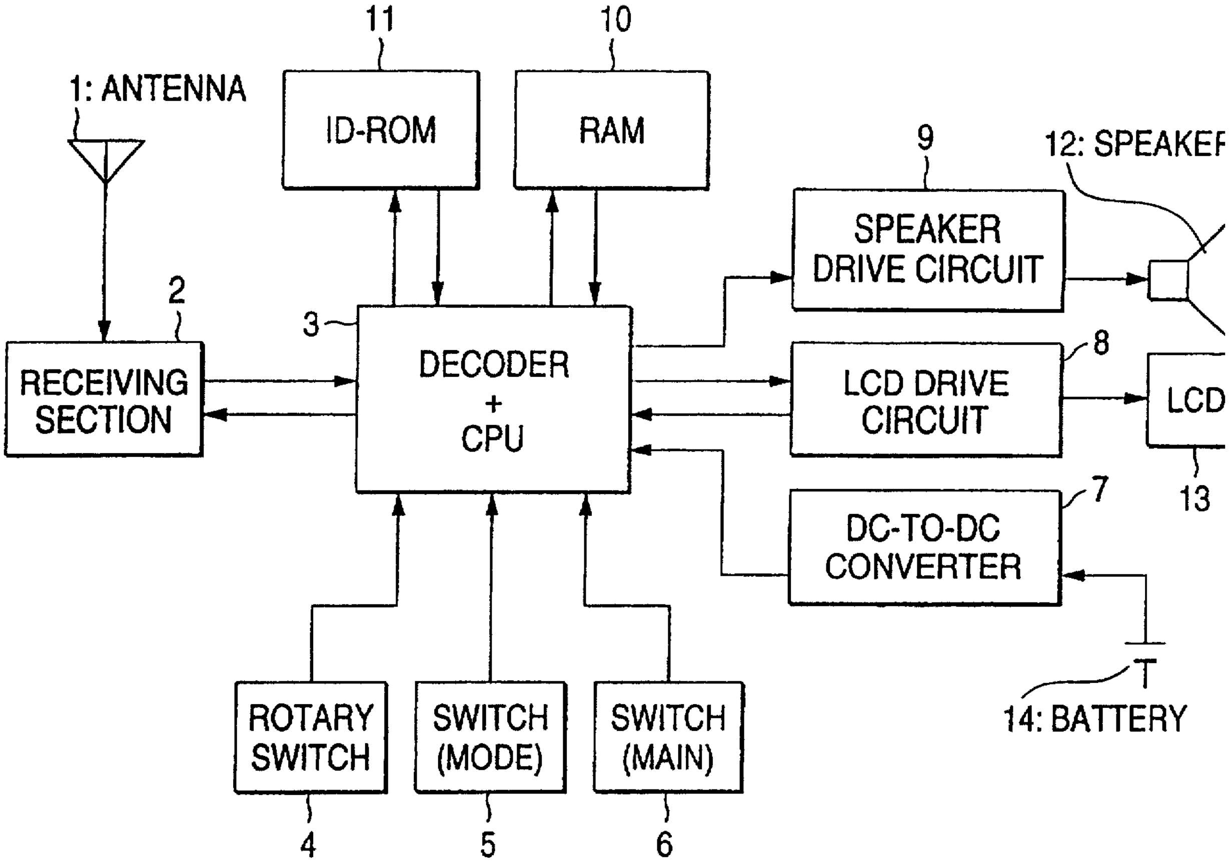

Next, the operation of a message protection function will be described by reference to FIG. 2. To begin with, the pager system changes to a message read mode by pressing the rotary switch 4 while the pager system is in a wait mode (SET step). An arbitrary message to be protected can be selected (STEP 1) by rotating the rotary switch 4 (SLCT step). As a result of pressing action of a switch 5 while the message to be selected is indicated on a display (MODE step), the pager system changes to a mode selection screen state, so that a protect/protect-cancel guidance message is displayed (STEP 2). If the selected message has a protection attribute, a protect-cancel verification message is displayed together with the selected message by pressing the rotary switch 4 while the guidance is displayed (SET step). In contrast, if the selected message does not have a protection attribute, a protect verification message is displayed together with the selected message (STEP 3). When the rotary switch 4 is pressed while the message is displayed (SET step), a decision is made as to whether or not the message has a protection attribute (STEP 4).

In a case where the selected message does not have a protection attribute, a decision is made as to whether or not the pager system's maximum-protection number is exceeded (STEP 5). If the maximum protection number is exceeded, a warning about exceeding the maximum protection number is displayed (STEP 6). Subsequently, after the warning message has disappeared as a result of a timeout occurring for one second (MODE step) or the rotary switch 4 (SET step) or the switch 5 (MODE step) being pressed, the oldest protected message is displayed together with a guidance message "Protect Cancel ?" (STEP 7). Messages having a protection attribute are displayed in a chronological order of receipt by rotation of the rotary switch 4 while the message is being displayed (SLCT step). In such a case, the rotary switch 4 functions as a selection switch. While there is displayed a message which is deemed to be least important among the messages having a protection attribute and whose protection attribute is canceled (STEP 8), the user presses the rotary switch 4 (SET step), thus determining a message whose protection attribute is canceled. In this case, the rotary switch 4 functions as a determination switch. As a result of the foregoing operations, cancellation of protection of the protected message and protection of a message originally desired to be protected are performed at one time (STEP 9). Subsequently, a message "Cancel+Protection Completed" is displayed (STEP 10). After the display has disappeared as a result of a timeout occurring for one second or the rotary switch 4 (SET step) or the switch 5 (MODE step) being pressed, the message that the user originally attempted to protect is displayed with a protection attribute mark (STEP 11). Simultaneously, the pager system changes to the message read mode (STEP 1).

As has been described above, according to the present embodiment, a portable radio terminal is arranged so as to display only received messages having a protection attribute in chronological order of receipt in a case where a protection attribute is provided to a message having no protection attribute while the number of protected messages is equal to the maximum protection number. The radio terminal cancels the protection of the thus-selected message simultaneous with providing a protection attribute to a message originally desired to be protected by selecting one from the displayed messages. As a result, cancellation of the protection attribute of the protected message and providing a protection attribute to the message originally desired to be protected can be carried out in one step. In this way, a message can be protected by way of considerably simple key operations.

The existing portable radio terminal involves two actions: that is, retrieval of a message having a protection attribute from all the received messages and cancellation of the protection attribute of the thus-retrieved message; and reading a message originally desired to be protected and providing a protection attribute to the thus-read message. In contrast, the portable radio terminal according to the present invention can cancel the protection attribute of a protected message and provide a protection attribute to another message which the user desires to protect, by way of a single action.

As is obvious from the foregoing descriptions, if an attempt to protect a message causes the number of protected messages exceeds the maximum protection number, a portable radio terminal according to the present invention displays messages having a protection attribute in chronological order of receipt and cancels a protection attribute of a protected message and provides a protection attribute to another message by performing a determination operation while a protect cancel message is displayed. As a result, cancellation of protection of the selected message and providing a protection attribute to a message which the user desires to protect can be carried out at one time. Consequently, the present invention produces the effect of rendering considerably easy an operation for providing a protection attribute to a message when the number of protected messages has reached the maximum protection number.

What is claimed is:

1. A portable radio terminal comprising:

means for storing only a predetermined number of received messages, means for deleting the oldest-message among messages having no protection attribute when the number of messages exceeds the predetermined number, means for changing the protection attribute of the message, means for detecting a protection attribute having been provided to a message having no protection attribute while the number of messages having a protection attribute is equal to the maximum protection number, means which, upon detection of execution of a protection-attribute assignment operation with regard to a message having no protection attribute while the number of messages having a protection attribute is equal to the maximum protection number, sequentially displays only messages having a protection attribute in response to actuation of a selection switch, and means which, upon detection of a determination switch being pressed while a message having a protection attribute is displayed as a message whose protection attribute is canceled, cancels the protection attribute of the message thus displayed.

2. The portable radio terminal of claim 1, further comprising:

means which, upon detection of the determination switch being pressed while a message having a protection attribute is displayed as a message whose protection attribute is canceled, cancels the protection of the thus-displayed message the instant when providing a protection attribute to the message for which the protection attribute assignment operation has been performed.

* * * * *

UNITED STATES PATENT AND TRADEMARK OFFICE

CERTIFICATE OF CORRECTION

PATENT NO. : 6,064,877
DATED : May 16, 2000
INVENTOR(S) : Yanagida

It is certified that error appears in the above-identified patent and that said Letters Patent is hereby corrected as shown below:

Sheet 1 of 3 of Drawings should be replaced by Sheet 1 of 3, as shown on the attached page.

Signed and Sealed this

Seventh Day of August, 2001

Nicholas P. Godici

*Attest:*

NICHOLAS P. GODICI

*Attesting Officer* *Acting Director of the United States Patent and Trademark Office*